(12) United States Patent
Chen et al.

(10) Patent No.: US 10,871,257 B2
(45) Date of Patent: Dec. 22, 2020

(54) SUPPORTING DEVICE

(71) Applicant: Compal Electronics, Inc., Taipei (TW)

(72) Inventors: I-Chen Chen, Taipei (TW); Li-Fang Chen, Taipei (TW); Ching-Hua Li, Taipei (TW)

(73) Assignee: Compal Electronics, Inc., Taipei (TW)

(*) Notice: Subject to any disclaimer, the term of this patent is extended or adjusted under 35 U.S.C. 154(b) by 138 days.

(21) Appl. No.: 16/159,514

(22) Filed: Oct. 12, 2018

(65) Prior Publication Data
US 2020/0018437 A1    Jan. 16, 2020

(30) Foreign Application Priority Data
Jul. 10, 2018  (TW) ............................. 107123800 A

(51) Int. Cl.
| | | |
|---|---|---|
| *F16M 11/10* | (2006.01) | |
| *H04M 1/04* | (2006.01) | |
| *F16M 13/00* | (2006.01) | |
| *F16M 11/04* | (2006.01) | |

(52) U.S. Cl.
CPC ........... *F16M 11/10* (2013.01); *F16M 11/041* (2013.01); *F16M 13/00* (2013.01); *H04M 1/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,295,680 A * | 2/1919 | Benson | ................... | A47B 27/02 108/4 |
| 2,037,435 A * | 4/1936 | Reichenbach | .......... | F21S 6/003 174/70 R |
| 4,947,763 A * | 8/1990 | Piorek | ..................... | A47B 21/03 108/147.19 |
| 5,460,104 A * | 10/1995 | Young, Sr. | ................ | A47B 3/00 108/115 |
| 6,227,518 B1 * | 5/2001 | Sun | ......................... | F16M 11/10 248/371 |
| 8,087,629 B2 * | 1/2012 | Gotovac | ................. | F16M 11/10 248/126 |
| 8,505,470 B1 * | 8/2013 | Lira | ........................ | A47B 23/04 108/10 |
| 8,708,298 B2 * | 4/2014 | Hu | ......................... | F16M 11/041 248/371 |
| 8,827,227 B2 * | 9/2014 | Nagaoka | ................. | F16M 11/08 248/346.01 |
| 9,046,215 B2 * | 6/2015 | Wang | ..................... | F16M 11/041 |
| 9,797,546 B1 * | 10/2017 | Lin | ......................... | A47B 23/04 |
| 10,470,564 B2 * | 11/2019 | Li | ........................... | H04R 1/025 |

FOREIGN PATENT DOCUMENTS

| | | |
|---|---|---|
| CN | 202929529 U | 5/2013 |
| TW | M419009 U1 | 12/2011 |

* cited by examiner

*Primary Examiner* — Monica E Millner

(57) ABSTRACT

A supporting device adapted to support an electronic apparatus is provided. The supporting device includes a base and a supporting frame. The base includes a first through hole and a second through hole. The supporting frame is adapted to support the electronic apparatus. The supporting frame includes an arc frame and a virtual axis. The arc frame passes through the first through hole and the second through hole so that a portion of the arc frame is located in the base. The arc frame rotates along the virtual axis so that the electronic apparatus is switched between a first state of use and a second state of use.

13 Claims, 7 Drawing Sheets

SUPPORTING DEVICE

FIELD OF THE INVENTION

The present invention relates to a supporting device, and more particularly to a supporting device which is adapted to support an electronic apparatus.

BACKGROUND OF THE INVENTION

With the evolution of technology, most of the electronic apparatuses on the market have slim appearance and can be easy to carry, and the electronic apparatuses use touch screen, through which the electronic apparatuses can be operated by inputting commands. Due to that a user cannot operate the electronic apparatus in a hand-held manner during long time, a supporting device that can fix and fasten the electronic apparatus is required, so that the user can operate the electronic apparatus without being in a hand-held manner (such as placed on a table).

However, the structure of the conventional supporting device for supporting an electronic apparatus is too complicated, and the conventional supporting device is easy to be damaged and cannot be used under frequent use. Moreover, since the complicated structure, the difficulty of the user in operating the supporting device is also increased. Therefore, how to improve the above problems is the focus of attention of relevant personnel in this field.

SUMMARY OF THE INVENTION

One of the objectives of the present invention is to provide a supporting device having a simple structure. When an electronic apparatus is placed on the supporting device of the present invention, the angle between the display surface of the electronic apparatus and the user can be adjusted quickly in a rotating manner.

Other objectives and advantages of the present invention can be further understood from the technical features disclosed in the present invention.

In order to achieve one or a part or all of the above objectives or other objectives, the present invention provides a supporting device adapted to support an electronic apparatus. The supporting device includes a base and a supporting frame. The base includes a first through hole and a second through hole. The supporting frame is adapted to support the electronic apparatus. The supporting frame includes an arc frame and a virtual axis. The arc frame passes through the first through hole and the second through hole so that a portion of the arc frame is located in the base. The arc frame rotates along the virtual axis so that the electronic apparatus is switched between a first state of use and a second state of use.

In an embodiment of the present invention, the electronic apparatus has a display surface. An included angle between the display surface of the electronic apparatus and the base is a first included angle when in the first state of use. The included angle between the display surface of the electronic apparatus and the base is switched from the first included angle to a second included angle when in the second state of use.

In an embodiment of the present invention, the supporting frame further includes a stopper portion. The stopper portion is disposed on the arc frame and located in the base. The stopper portion abuts against a portion of the base adjacent to the first through hole when in the first state of use. The stopper portion abuts against a portion of the base adjacent to the second through hole when in the second state of use.

In an embodiment of the present invention, the arc frame has a first surface and a second surface opposite to the first surface. The first surface faces the base. The second surface faces the electronic apparatus. The stopper portion is disposed on the first surface or the second surface.

In an embodiment of the present invention, the supporting device further includes at least two limiting assemblies. The limiting assemblies are disposed in the base. The limiting assemblies have a limiting space respectively. A portion of the arc frame is located in the limiting spaces.

In an embodiment of the present invention, each of the limiting assemblies includes a first limiting portion, a second limiting portion and a lock attachment. The first limiting portion is opposite to the second limiting portion. The first limiting portion and the second limiting portion define the limiting space. The lock attachment is locked to the first limiting portion and the second limiting portion.

In an embodiment of the present invention, the supporting frame further includes a first stopper portion and a second stopper portion. The first stopper portion and the second stopper portion are disposed on the arc frame. The arc frame has a first surface and a second surface opposite to the first surface. The first surface faces the base. The second surface faces the electronic apparatus. The first stopper portion and the second stopper portion are disposed on the first surface and located above the base. The first stopper portion abuts against a portion of the base adjacent to the first through hole when in the first state of use. The second stopper portion abuts against a portion of the base adjacent to the second through hole when in the second state of use.

In an embodiment of the present invention, the base further includes an upper cover and a lower cover opposite to the upper cover. The first through hole and the second through hole are disposed on the upper cover. A portion of the arc frame is located between the upper cover and the lower cover.

In an embodiment of the present invention, the base further includes a plurality of side walls. The side walls are adjacent between the upper cover and the lower cover. The side walls include two side walls opposite to each other. The first through hole and the second through hole are respectively extended from one of the two side walls to the other one of the two side walls. There is a gap between the first through hole and the second through hole.

In an embodiment of the present invention, the base further includes a first partial housing and a second partial housing. The second partial housing is located above the first partial housing. The first through hole and the second through hole are disposed on the second partial housing.

In an embodiment of the present invention, the supporting frame further includes a baffle and a bearing portion. The baffle is connected to a first end portion of the arc frame. The bearing portion is connected to a second end portion of the arc frame opposite to the first end portion. The display surface of the electronic apparatus faces the baffle. A back of the electronic apparatus opposite to the display surface faces the bearing portion.

In an embodiment of the present invention, the supporting device further includes at least one electric assembly, an electric connection portion and a circuit trace. The at least one electric assembly is disposed in the base. The electric connection portion is disposed on the arc frame. The electric connection portion is electrically connected to the at least one electric assembly by the circuit trace.

In an embodiment of the present invention, the arc frame further includes a first surface, a second surface opposite to the first surface, an accommodation space and a protective cap. The first surface faces the base. The second surface faces the electronic apparatus. The accommodation space is opened on the first surface. The protective cap covers the accommodation space. The electric connection portion is disposed on the second surface. A portion of the circuit trace is located between the accommodation space and the protective cap.

In an embodiment of the present invention, the supporting device further includes a friction component and a lock attachment. The friction component is disposed on an inner wall surface of one of the first through hole and the second through hole. The lock attachment is locked to the base and abuts against the friction component so that the friction component is in contact with the arc frame. The arc frame and the friction component rub to generate a torque when the arc frame rotates along the virtual axis.

In summary, in the supporting device of the embodiment of the present invention, the arc frame passes through the first through hole and the second through hole of the base and therefore a portion of the arc frame is located in the base. As such, when the electronic apparatus is placed on the arc frame and the arc frame rotates along the virtual axis in response to the user's operation, the electronic apparatus can be switched to different states of use. The supporting device of the embodiment of the invention has a simple structure and is easy to be operated by the user. Further, in the case of having simple structure, the service life of the supporting device of the embodiment of the invention is also greatly improved.

In order to make the above and other objects, features and advantages of the present invention become more apparent and obvious, the preferred embodiments will be described in detail with reference to the accompanying drawings hereinafter.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
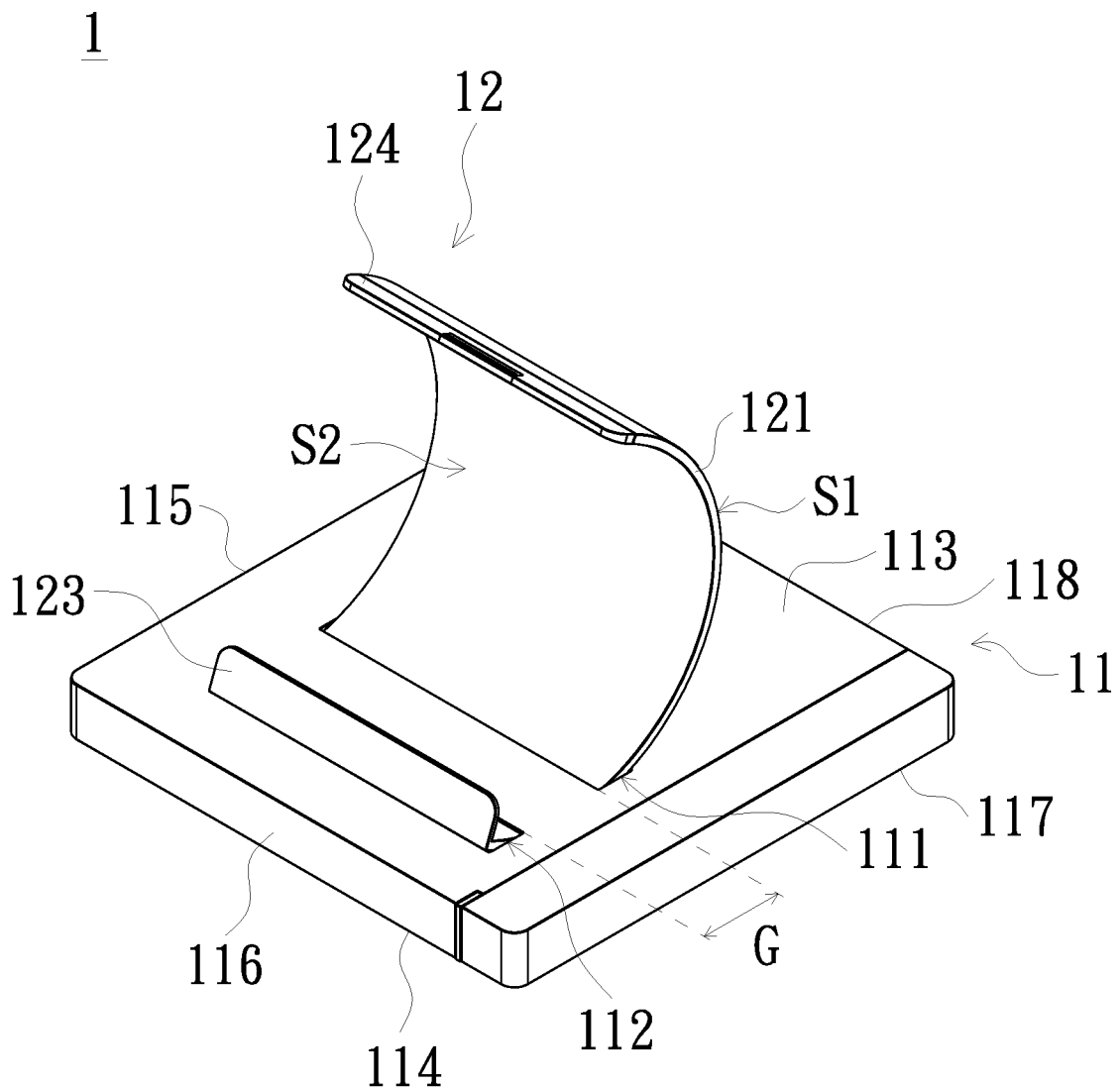
FIG. 1 is a schematic perspective view of a supporting device according to an embodiment of the present invention.
Figure 2:
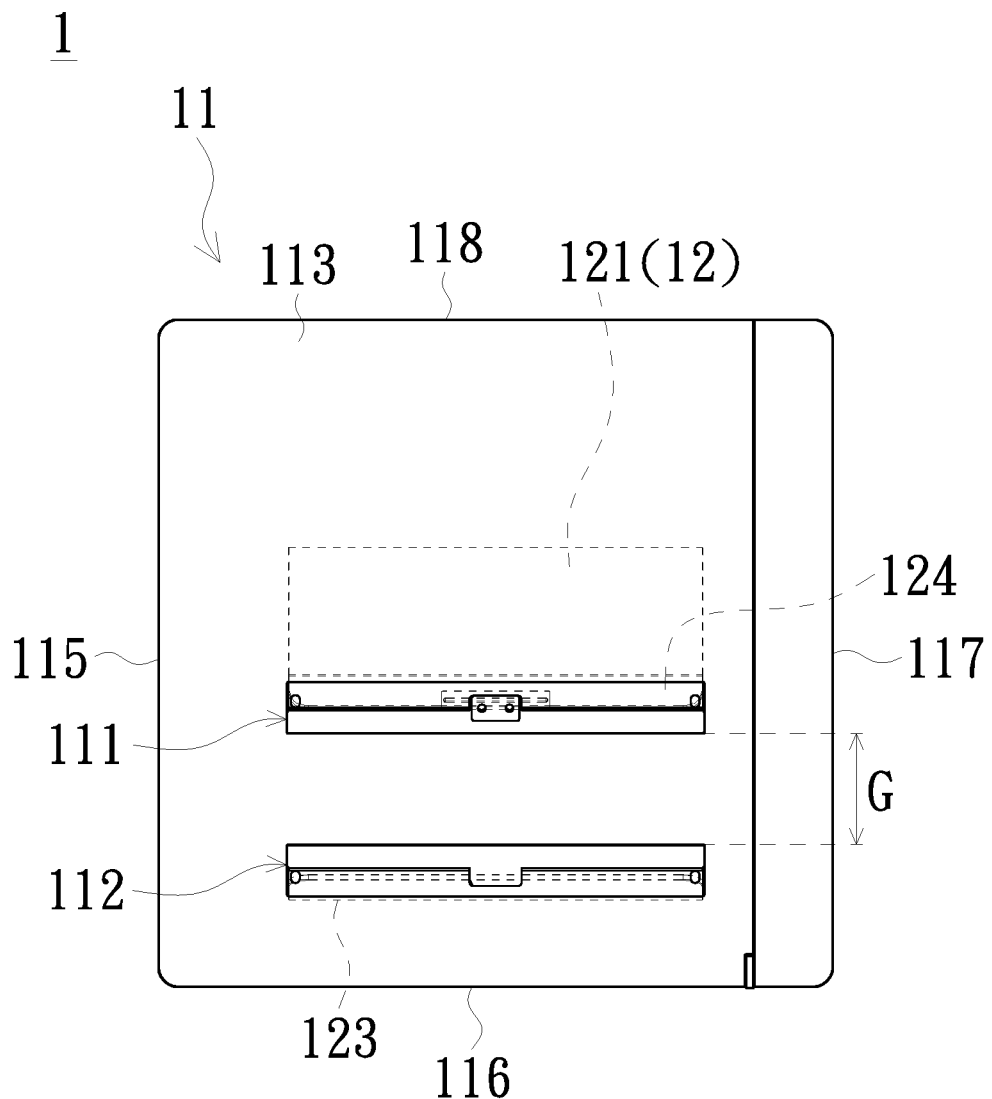
FIG. 2 is a schematic top view of the supporting device shown in FIG. 1.
Figure 3:
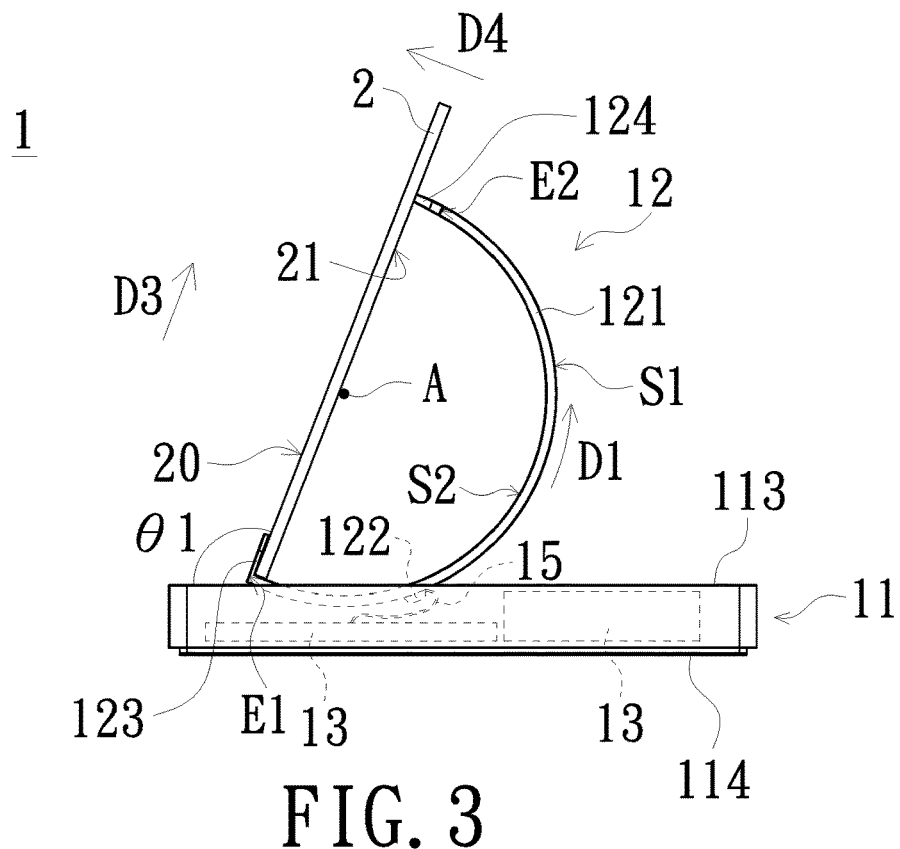
FIG. 3 is a schematic side view of the supporting device shown in FIG. 1 in a state of use.
Figure 4:
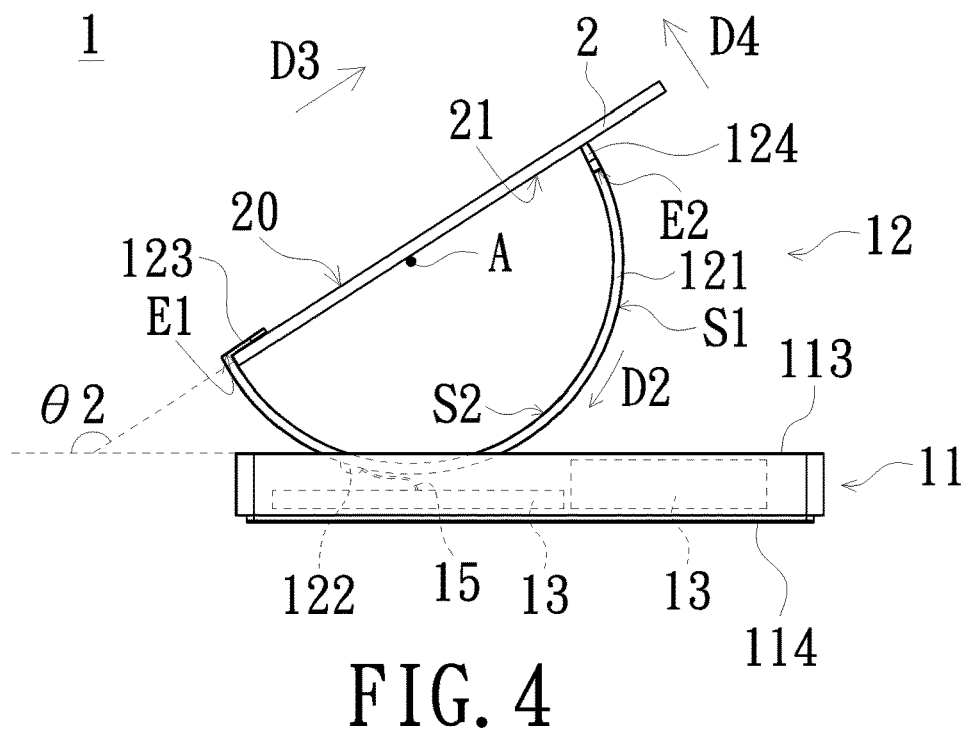
FIG. 4 is a schematic side view of the supporting device shown in FIG. 1 in another state of use.

FIG. 1 is a schematic perspective view of a supporting device according to an embodiment of the present invention. FIG. 2 is a schematic top view of the supporting device shown in FIG. 1. FIG. 3 is a schematic side view of the supporting device shown in FIG. 1 in a state of use. FIG. 4 is a schematic side view of the supporting device shown in FIG. 1 in another state of use. As shown in FIG. 1 to FIG. 4, the supporting device 1 of the embodiment includes a base 11 and a supporting frame 12. The base 11 includes a first through hole 111 and a second through hole 112. The supporting frame 12 includes an arc frame 121 and a virtual axis A. The arc frame 121 passes through the first through hole 111 and the second through hole 112 of the base 11 so that a portion of the arc frame 121 is located in the base 11. When an electronic apparatus 2 is placed on the arc frame 121 of the supporting frame 12, the electronic apparatus 2 is switched between the first state of use and the second state of use in response to the user's operations. As shown in FIG. 3, the included angle between the display surface 20 of the electronic apparatus 2 and the base 11 is the first included angle $\theta1$ in the first state of use. In the embodiment, the angle of the first included angle $\theta1$ is, for example, 110 degrees. That is, when the state of use of the electronic apparatus 2 is in a viewing mode, the user can view the images displayed by the display surface 20 in a better viewing angle. As shown in FIG. 4, the included angle between the display surface 20 of the electronic apparatus 2 and the base 11 is switched from the first included angle $\theta1$ to the second included angle $\theta2$ in the second state of use. In the embodiment, the angle of the second included angle $\theta2$ is, for example, 150 degrees. That is, when the state of use of the electronic apparatus 2 is in a touch mode, the user can touch and operate the electronic apparatus 2 in this state of use.

The first included angle $\theta1$ between the display surface 20 of the electronic apparatus 2 and the base 11 being 110 degrees in the first state of use is only an embodiment of the present invention, and the present invention is not limited thereto. The angle of the first included angle $\theta1$ may be adjusted to an angle suitable for the user to view according to the actual situation. The second included angle $\theta2$ between the display surface 20 of the electronic apparatus 2 and the base 11 being 150 degrees in the second state of use is only an embodiment of the present invention, and the present invention is not limited thereto. The angle of the second included angle $\theta2$ may be adjusted to an angle suitable for the user to perform a touch operation according to the actual situation. In addition, in the embodiment, the base 11 is, for example, a docking station and is adapted to be connected to the electronic apparatus 2 so that the function of the electronic apparatus 2 can be expanded. The docking station is equipped with an electric assembly 13 such as an expanded hard drive disk, an expanded graphics processor, an input/output port, etc. In the embodiment, the electronic apparatus 2 is, for example, a tablet computer or smart phone, but the present invention is not limited thereto.

Further descriptions on other detailed configurations of the supporting device 1 of the embodiment will be described below.

As shown in FIG. 1 to FIG. 4, the base 11 of the embodiment further includes an upper cover 113 and a lower cover 114. The first through hole 111 and the second through hole 112 of the base 11 are disposed on the upper cover 113 and are adjacent to each other. The portion of the arc frame 121 in the base 11 is located between the upper cover 113 and the lower cover 114. In addition, the base 11 of the embodiment further includes a plurality of side walls 115, 116, 117 and 118. The side walls 115, 116, 117 and 118 are adjacent between the upper cover 113 and the lower cover 114. The side wall 115 and the side wall 117 are opposite to each other, and the side wall 116 and the side wall 118 are opposite to each other. The first through hole 111 and the second through hole 112 of the base 11 are respectively extended from the side wall 115 to the side wall 117, and there is a gap G between the first through hole 111 and the second through hole 112. The size of the gap G between the first through hole 111 and the second through hole 112 is not limited in the present invention, and the size of the gap G may vary according to the actual situation. For example, when the gap G between the first through hole 111 and the second through hole 112 increases, the portion of the arc frame 121 of the supporting frame 12 located in the base 11 also increases, so that the overall height of the supporting device 1 decreases, and thereby effectively reducing the volume of the supporting device 1. When the gap G between the first through hole 111 and the second through hole 112 decreases, the portion of the arc frame 121 of the supporting frame 12 located in the base 11 also decreases, so that the overall height of the supporting device 1 increases, and thereby effectively increasing the capacity of the base 11 to accommodate the electric assembly 13.

As shown in FIG. 1 to FIG. 4, the supporting frame 12 of the embodiment further includes a stopper portion 122. The stopper portion 122 is disposed on the arc frame 121 and located in the base 11; that is, the stopper portion 122 is disposed on the portion of the arc frame 121 in the base 11. As shown in FIG. 3, in the first state of use, the arc frame 121 of the supporting frame 12 rotates in the first direction D1 along the virtual axis A in response to the user's operation so that the display surface 20 of the electronic apparatus 2 and the base 11 have the first included angle θ1 therebetween. Then, the stopper portion 122 of the supporting frame 12 abuts against the portion of the base 11 (i.e., abut against the upper cover 113 of the base 11) adjacent to the first through hole 111 (shown in FIG. 1 and FIG. 2), so that the arc frame 121 stops rotating and the state in which the first included angle θ1 is formed between the display surface 20 and the base 11 is maintained. As shown in FIG. 4, in the second state of use, the arc frame 121 of the supporting frame 12 rotates in the second direction D2 opposite to the first direction D1 along the virtual axis A in response to the user's operation so that the display surface 20 of the electronic apparatus 2 and the base 11 have the second included angle θ2 therebetween. Then, the stopper portion 122 of the supporting frame 12 abuts against the portion of the base 11 (i.e., abut against the upper cover 113 of the base 11) adjacent to the second through hole 112 (shown in FIG. 1 and FIG. 2), so that the arc frame 121 stops rotating and the state in which the second included angle θ2 is formed between the display surface 20 and the base 11 is maintained.

As shown in FIG. 1 to FIG. 4, the arc frame 121 of the supporting frame 12 of the embodiment has a first surface S1 and a second surface S2 opposite to the first surface S1. The first surface S1 of the arc frame 121 faces the direction toward the base 11, and the second surface S2 of the arc frame 121 faces the direction toward the electronic apparatus 2. In the embodiment, the stopper portion 122 of the supporting frame 12 is, for example, disposed on the first surface S1 of the arc frame 121, but the present invention is not limited thereto. In other embodiments, the stopper portion 122 of the supporting frame 12 is, for example, disposed on the second surface S2 of the arc frame 121.

As shown in FIG. 1 to FIG. 4, the supporting frame 12 of the embodiment further includes a baffle 123 and a bearing portion 124. The baffle 123 is connected to a first end portion E1 of the arc frame 121, and the bearing portion 124 is connected to a second end portion E2 of the arc frame 121 opposite to the first end portion E1. In detail, in the embodiment, the baffle 123 extends in an extending direction D3 from the first end portion E1 toward the second end portion E2 of the arc frame 121 (that is, extend in a direction toward the electronic apparatus 2); and the bearing portion 124 extends in an extending direction D4 from the second end portion E2 of the arc frame 121 toward away from the arc frame 121. That is, the extending direction D3 of the baffle 123 and the extending direction D4 of the bearing portion 124 are perpendicular to each other. When the electronic apparatus 2 is placed on the supporting frame 12, the display surface 20 of the electronic apparatus 2 faces the baffle 123 of the supporting frame 12, and the back 21 of the electronic apparatus 2 faces the bearing portion 124. That is, the display surface 20 of the electronic apparatus 2 abuts against the baffle 123 of the supporting frame 12, and the back 21 of the electronic apparatus 2 abuts against the bearing portion 124. Thus, the electronic apparatus 2 is prevented from falling off from the arc frame 121 when the arc frame 121 is rotated. It is to be noted that the present invention does not limit the configuration of the baffle 123 and the bearing portion 124, and the configuration of the baffle 123 and the bearing portion 124 may vary according to actual needs.

Figure 5:
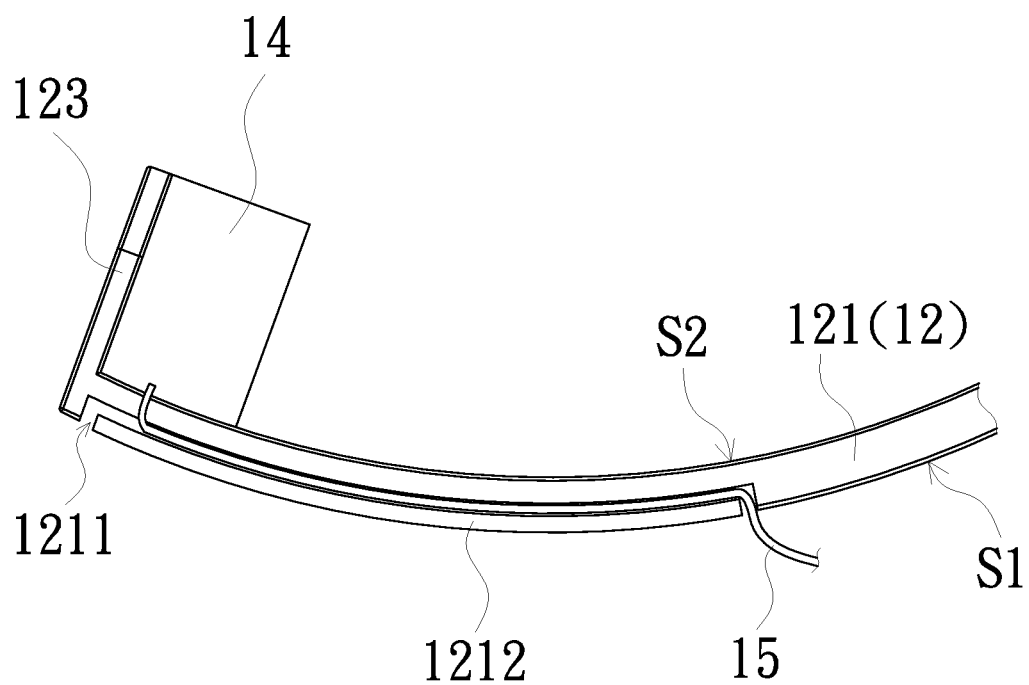
FIG. 5 is a schematic partial enlarged side view of the supporting frame shown in FIG. 3 and FIG. 4.

FIG. 5 is a schematic partial enlarged side view of the supporting frame 12 shown in FIG. 3 and FIG. 4. It is to be noted that for the convenience of explanation, FIG. 5 only shows the necessary components, and please refer to FIG. 1 to FIG. 4 for the remaining components which are omitted in FIG. 5. As shown in FIG. 1 to FIG. 5, the supporting device 1 of the embodiment further includes an electric connection portion 14 and a circuit trace 15. The electric connection portion 14 is disposed on the arc frame 121 of the supporting frame 12 and is electrically connected to the electric assembly 13 located in the base 11 (shown in FIG. 3 and FIG. 4) by the circuit trace 15. In detail, the electric connection portion 14 is disposed on the second surface S2 of the arc frame 121 and is located on a position of the arc frame 121 adjacent to the baffle 123. When the electronic apparatus 2 is placed on the arc frame 121, the electric connection portion 14 on the arc frame 121 may be electrically connected to another matched electric connection portion of the electronic apparatus 2. In addition, the arc frame 121 of the embodiment further includes an accommodation space 1211 and a protective cap 1212. The accommodation space 1211 of the arc frame 121 is opened on the first surface S1, and the protective cap 1212 covers the accommodation space 1211. In the embodiment, a portion of the circuit trace 15 is located between the accommodation space 1211 and the protective cap 1212. In detail, a portion of the circuit trace 15 is located in the accommodation space 1211 via a through hole opened in the arc frame 121, and the remaining portion of the circuit trace 15 located outside the accommodation space 1211 is respectively electrically connected to the electric connection portion 14 and the electric assembly 13. Under such a structural design, when the arc frame 121 of the supporting frame 12 rotates along the virtual axis A in the first direction D1 (first state of use) or the second direction D2 (second state of use) in response to the user's operation, the circuit trace 15 is prevented, by the protective cap 1212 covering the circuit trace 15, from being exposed outside the base 11 caused by the rotation of the arc frame 121.

Figure 6:
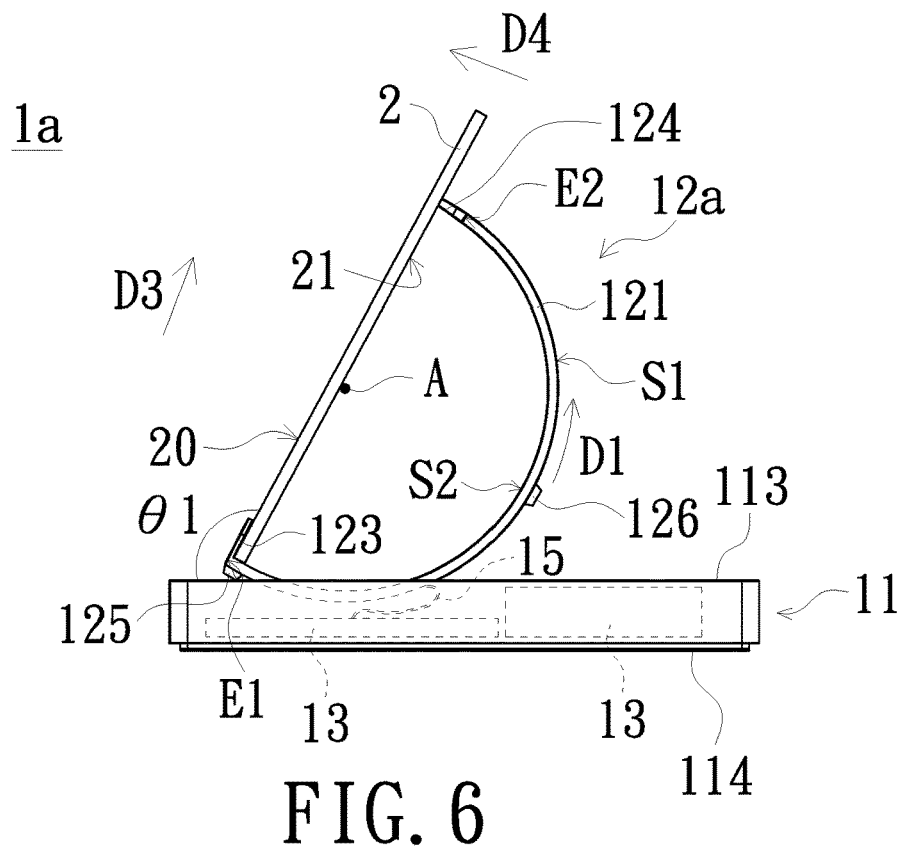
FIG. 6 is a schematic side view of a supporting device in a state of use according to another embodiment of the present invention.
Figure 7:
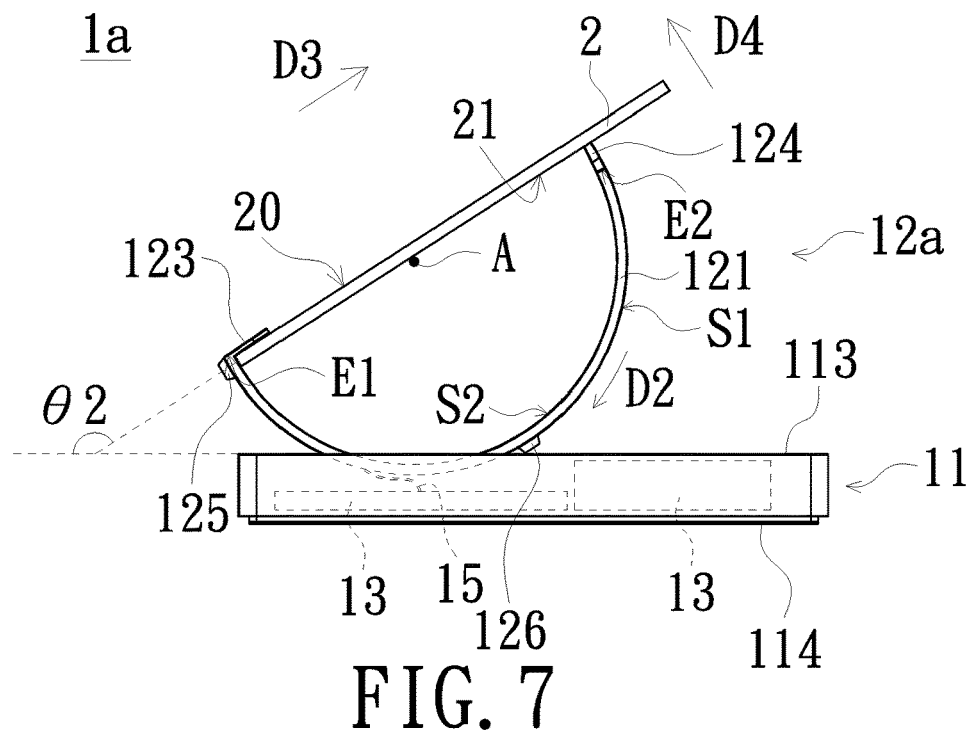
FIG. 7 is a schematic side view of the supporting device shown in FIG. 6 in another state of use.

FIG. 6 is a schematic side view of a supporting device in a state of use according to another embodiment of the present invention. FIG. 7 is a schematic side view of the supporting device shown in FIG. 6 in another state of use. As shown in FIG. 6 and FIG. 7, the supporting device 1a of the embodiment is similar to the supporting device 1 shown in FIG. 1 to FIG. 5, and the main difference is that the supporting frame 12a of the embodiment further includes a first stopper portion 125 and a second stopper portion 126. In the embodiment, the first stopper portion 125 and the second stopper portion 126 are respectively disposed on the first surface S1 of the arc frame 121 and located above the base 11. In detail, the first stopper portion 125 and the second stopper portion 126 are respectively disposed on the two sides of the electronic apparatus 2. As shown in FIG. 6, in the first state of use, the arc frame 121 of the supporting frame 12a rotates in the first direction D1 along the virtual axis A in response to the user's operation so that the display surface 20 of the electronic apparatus 2 and the base 11 have the first included angle θ1 therebetween. Then, the first stopper portion 125 of the supporting frame 12a abuts against the portion of the base 11 (i.e., abut against the upper cover 113 of the base 11) adjacent to the first through hole 111, so that the arc frame 121 stops rotating and the state in which the first included angle θ1 is formed between the display surface 20 and the base 11 is maintained. As shown in FIG. 7, in the second state of use, the arc frame 121 of the supporting frame 12a rotates in the second direction D2 along the virtual axis A in response to the user's operation so that the display surface 20 of the electronic apparatus 2 and the base 11 have the second included angle θ2 therebetween. Then, the second stopper portion 126 of the supporting frame 12a abuts against the portion of the base 11 (i.e., abut against the upper cover 113 of the base 11) adjacent to the second through hole 112, so that the arc frame 121 stops rotating and the state in which the second included angle θ2 is formed between the display surface 20 and the base 11 is maintained.

Figure 8:
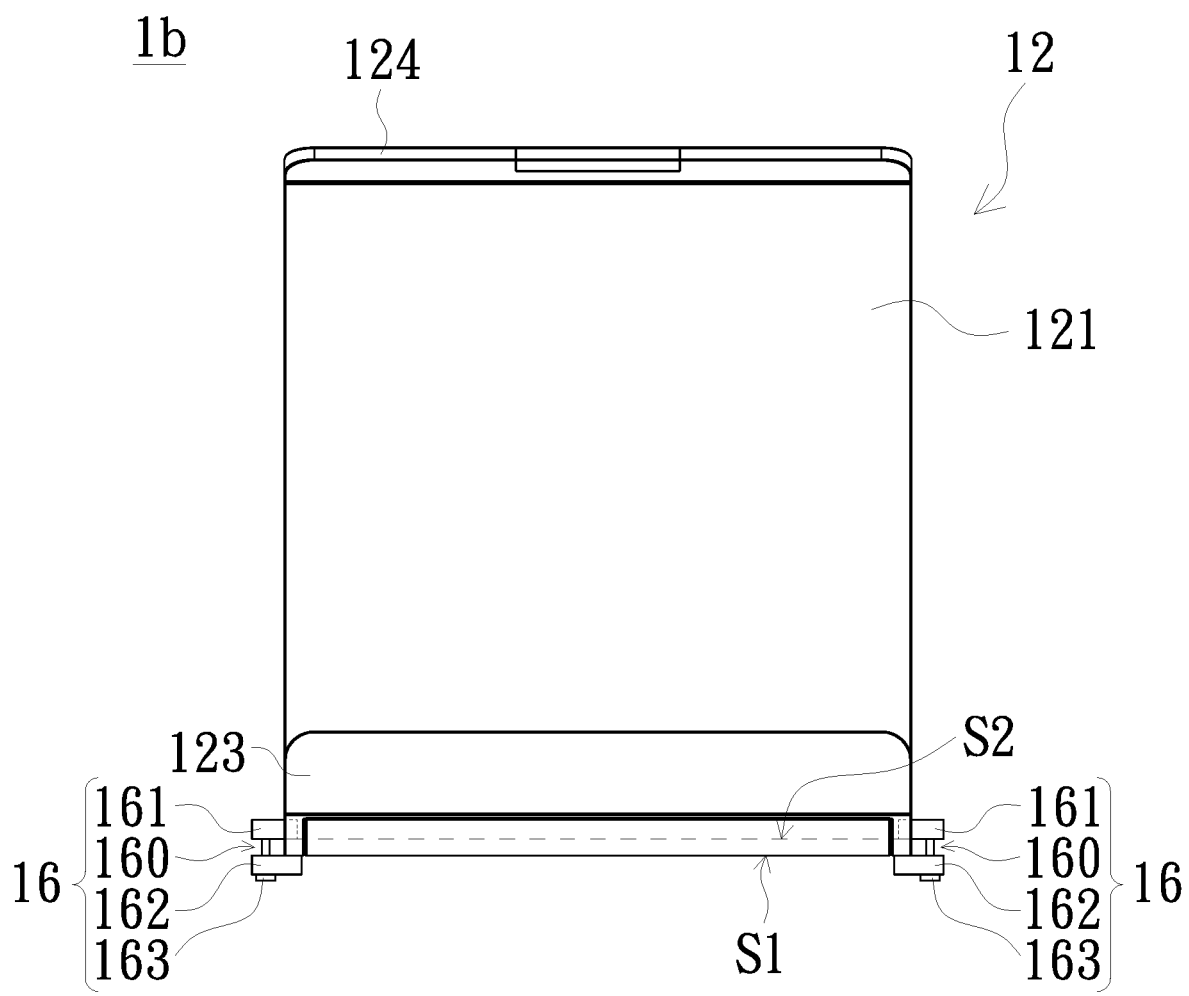
FIG. 8 is a schematic front view of a supporting device according to another embodiment of the present invention.

FIG. 8 is a schematic front view of a supporting device according to another embodiment of the present invention. It is to be noted that for the convenience of explanation, the base 11 is omitted in FIG. 8. As shown in FIG. 8, the supporting device 1b of the embodiment is similar to the supporting device shown in FIG. 1 to FIG. 5, and the main difference is that the supporting device 1b of the embodiment further includes at least two limiting assemblies 16. The limiting assemblies 16 are disposed in the base 11, each of the limiting assemblies 16 has a limiting space 160, and a portion of the arc frame 121 of the supporting frame 12 is located in the limiting spaces 160. In detail, the limiting assemblies 16 are respectively located on the two sides of the arc frame 121 and are located between the upper cover 113 and the lower cover 114 of the base 11. In the embodiment, each of the limiting assemblies 16 includes a first limiting portion 161, a second limiting portion 162 and a lock attachment 163. The first limiting portion 161 is opposite to the second limiting portion 162, the first limiting portion 161 and the second limiting portion 162 define the limiting space 160, and the lock attachment 163 is locked to the first limiting portion 161 and the second limiting portion 162. In addition, the first limiting portions 161 of the limiting assemblies 16 are in contact with the second surface S2 of the arc frame 121, the second limiting portions 162 are in contact with the first surface S1 of the arc frame 121. It is to be noted that the first limiting portions 161 and the second limiting portions 162 of the embodiment are only in contact with the second surface S2 and first surface S1 of the arc frame 121 respectively, and the first limiting portions 161 and the second limiting portions 162 do not clamp the arc frame 121 to make it unable to rotate. The effect of the limiting assembles 16 is to avoid the problem of left and right sway when the arc frame 121 of the supporting frame 12 is rotated along the virtual axis A.

Figure 9:
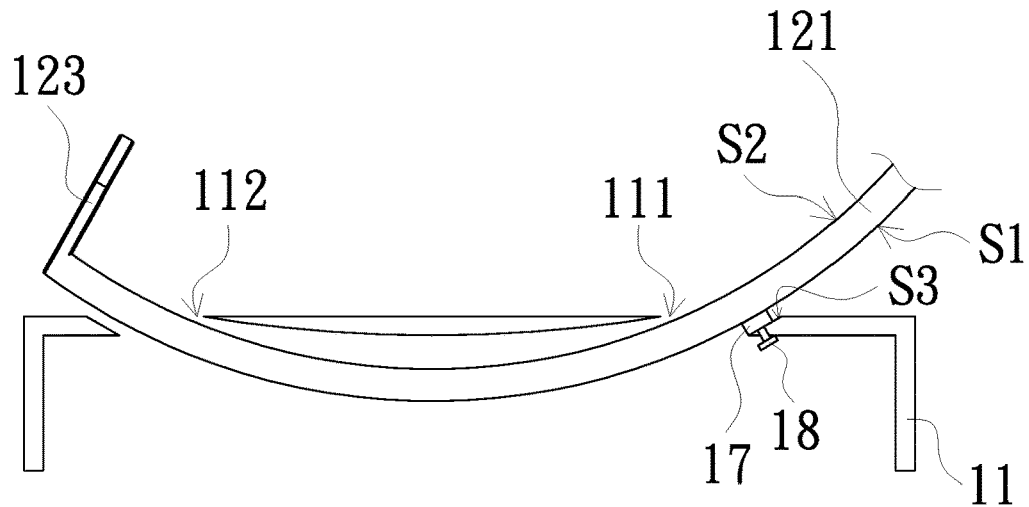
FIG. 9 is a schematic structural view of a supporting device according to another embodiment of the present invention.

FIG. 9 is a schematic structural view of a supporting device according to another embodiment of the present invention. As shown in FIG. 9, the supporting device 1c of the embodiment is similar to the supporting device 1 shown in FIG. 1 to FIG. 5, and the main difference is that the supporting device 1c of the embodiment further includes a friction component 17 and a lock attachment 18. The friction component 17 is disposed on the inner wall surface of any one of the first through hole 111 and the second through hole 112 of the base 11. In the embodiment, the friction component 17 is, for example, disposed to the inner wall surface S3 of the first through hole 111, the lock attachment 18 is locked to the base 11 and abuts against the friction component 17, so that the friction component 17 is in contact with the first surface S1 of the arc frame 121. When the arc frame 121 of the supporting frame 12 rotates along the virtual axis A, the arc frame 121 and the friction component 17 rub against to each other to generate a torque, and the torque between the arc frame 121 and the friction component 17 depends on the degree of the tightness of the lock attachment 18 locked to the base 11. The tighter the lock attachment 18 is locked, the greater the force against the friction component 17, and the greater the torque generated between the arc frame 121 and the friction component 17. The looser the lock attachment 18 is locked, the smaller the force against the friction member 17, and the smaller the torque generated between the arc frame 121 and the friction component 17.

Figure 10:
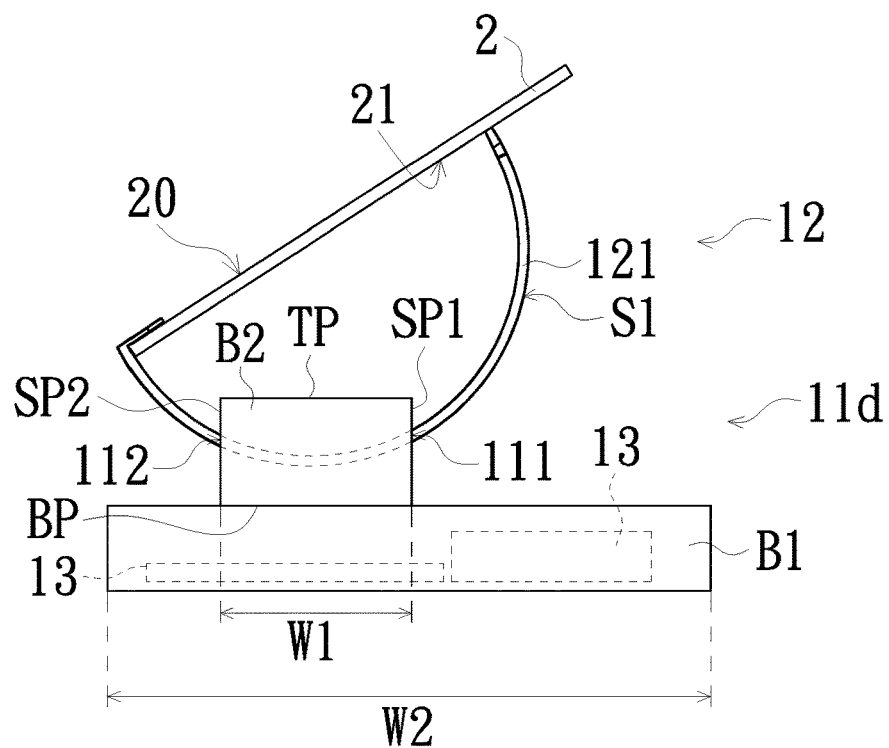
FIG. 10 is a schematic structural view of a supporting device according to another embodiment of the present invention.

FIG. 10 is a schematic structural view of a supporting device according to another embodiment of the present invention. As shown in FIG. 10, the supporting device 1d of the embodiment is similar to the supporting device 1 shown in FIG. 1 to FIG. 5, and the main difference is that the base 11d of the supporting device 1d of the embodiment further includes a first partial housing B1 and a second partial housing B2. The first partial housing B1 and the second partial housing B2 are superposed to each other, the second partial housing B2 is located above the first partial housing B1, and the first through hole 111 and the second through hole 112 are disposed on the second partial housing B2. In the embodiment, the width W1 of the second partial housing B2 is smaller than the width W2 of the first partial housing B1. The electric assembly 13 such as an expanded hard drive disc, an expanded graphics processor, or an input/output port, etc. is disposed in the first partial housing B1. The second partial housing B2 has a top portion TP and a bottom portion BP opposite to each other and side portions SP1 and SP2 adjacent between the top portion TP and the bottom portion BP and opposite to each other. The first through hole 111 and the second through hole 112 are opened on the side portion SP1 and the side portion SP2 respectively. The arc frame 121 of the supporting frame 12 passes through the first through hole 111 and the second through hole 112 of the second partial housing B2 so that a portion of the arc frame 121 is located in the second partial housing B2.

In summary, in the supporting device of the embodiment of the present invention, the arc frame passes through the first through hole and the second through hole of the base and therefore a portion of the arc frame is located in the base. As such, when the electronic apparatus is placed on the arc frame and the arc frame rotates along the virtual axis in response to the user's operation, the electronic apparatus can be switched to different states of use. The supporting device of the embodiment of the invention has a simple structure and is easy to be operated by the user. Further, in the case of having simple structure, the service life of the supporting device of the embodiment of the invention is also greatly improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A supporting device, adapted to support an electronic apparatus, and the supporting device comprising:
    a base, comprising a first through hole and a second through hole;
    a supporting frame, adapted to support the electronic apparatus, wherein the supporting frame comprises an arc frame and a virtual axis, the arc frame passes through the first through hole and the second through hole so that a portion of the arc frame is located in the base, and the arc frame rotates along the virtual axis so that the electronic apparatus is switched between a first state of use and a second state of use; and
    at least one electric assembly, an electric connection portion and a circuit trace, wherein the at least one electric assembly is disposed in the base, the electric connection portion is disposed on the arc frame, and the electric connection portion is electrically connected to the at least one electric assembly by the circuit trace.

2. The supporting device according to claim 1, wherein the electronic apparatus has a display surface, an included angle between the display surface of the electronic apparatus and the base is a first included angle when in the first state of use, and the included angle between the display surface of the electronic apparatus and the base is switched from the first included angle to a second included angle when in the second state of use.

3. The supporting device according to claim 1, wherein the supporting frame further comprises a stopper portion, the stopper portion is disposed on the arc frame and located in the base, the stopper portion abuts against a portion of the base adjacent to the first through hole when in the first state of use, and the stopper portion abuts against a portion of the base adjacent to the second through hole when in the second state of use.

4. The supporting device according to claim 3, wherein the arc frame has a first surface and a second surface opposite to the first surface, the first surface faces the base, the second surface faces the electronic apparatus, and the stopper portion is disposed on the first surface or the second surface.

5. The supporting device according to claim 1, further comprising at least two limiting assemblies, wherein the limiting assemblies are disposed in the base, the limiting assemblies have a limiting space respectively, and a portion of the arc frame is located in the limiting spaces.

6. The supporting device according to claim 5, wherein each of the limiting assemblies comprises a first limiting portion, a second limiting portion and a lock attachment, the first limiting portion is opposite to the second limiting portion, the first limiting portion and the second limiting portion define the limiting space, and the lock attachment is locked to the first limiting portion and the second limiting portion.

7. The projection apparatus according to claim 6, wherein the wheel module further comprises a housing for enclosing the wheel, the housing has an opening, the opening exposes the wheel, the light detecting element is disposed at the housing and covers the opening, and the optical transceiver component faces the wheel.

8. The supporting device according to claim 7, wherein the base further comprises a plurality of side walls, the side walls are adjacent between the upper cover and the lower cover, the side walls comprise two side walls opposite to each other, the first through hole and the second through hole are respectively extended from one of the two side walls to the other one of the two side walls, and there is a gap between the first through hole and the second through hole.

9. The supporting device according to claim 1, wherein the base further comprises a first partial housing and a second partial housing, the second partial housing is located above the first partial housing, and the first through hole and the second through hole are disposed on the second partial housing.

10. The supporting device according to claim 2, wherein the supporting frame further comprises a baffle and a bearing portion, the baffle is connected to a first end portion of the arc frame, the bearing portion is connected to a second end portion of the arc frame opposite to the first end portion, the display surface of the electronic apparatus faces the baffle, and a back of the electronic apparatus opposite to the display surface faces the bearing portion.

11. The supporting device according to claim 1, wherein the arc frame further comprises a first surface, a second surface opposite to the first surface, an accommodation space and a protective cap, the first surface faces the base, the second surface faces the electronic apparatus, the accommodation space is opened on the first surface, the protective cap covers the accommodation space, the electric connection portion is disposed on the second surface, and a portion of the circuit trace is located between the accommodation space and the protective cap.

12. The supporting device according to claim 1, further comprising a friction component and a lock attachment, wherein the friction component is disposed on an inner wall surface of one of the first through hole and the second through hole, the lock attachment is locked to the base and abuts against the friction component so that the friction component is in contact with the arc frame, and the arc frame and the friction component rub to generate a torque when the arc frame rotates along the virtual axis.

13. A supporting device, adapted to support an electronic apparatus, and the supporting device comprising:
    a base, comprising a first through hole and a second through hole; and
    a supporting frame, adapted to support the electronic apparatus, wherein the supporting frame comprises an arc frame and a virtual axis, the arc frame passes through the first through hole and the second through hole so that a portion of the arc frame is located in the base, and the arc frame rotates along the virtual axis so that the electronic apparatus is switched between a first state of use and a second state of use;

wherein the supporting frame further comprises a first stopper portion and a second stopper portion, the first stopper portion and the second stopper portion are disposed on the arc frame, the arc frame has a first surface and a second surface opposite to the first surface, the first surface faces the base, the second surface faces the electronic apparatus, the first stopper portion and the second stopper portion are disposed on the first surface and located above the base, the first stopper portion abuts against a portion of the base adjacent to the first through hole when in the first state of use, and the second stopper portion abuts against a portion of the base adjacent to the second through hole when in the second state of use.

* * * * *